(12) United States Patent
Jenkins

(10) Patent No.: US 6,637,829 B1
(45) Date of Patent: Oct. 28, 2003

(54) DECORATIVE JEWELED WHEEL COVER

(76) Inventor: Vernon Jenkins, 509A E. Baruch St. Bi-Lo Shopping Center, Denmark, SC (US) 29042

( * ) Notice: Subject to any disclaimer, the term of this patent is extended or adjusted under 35 U.S.C. 154(b) by 0 days.

(21) Appl. No.: 10/114,092

(22) Filed: Apr. 2, 2002

(51) Int. Cl.$^7$ .................................................. B60B 7/06
(52) U.S. Cl. .............................. 301/37.108; 301/37.41; 359/524
(58) Field of Search ...................... 301/37.101, 37.26, 301/37.11, 37.108, 37.104, 37.109, 37.41, 37.43; 362/473, 500; 359/523, 524; D12/204, 207

(56) References Cited

U.S. PATENT DOCUMENTS

| | | | | |
|---|---|---|---|---|
| 655,393 A | * | 8/1900 | Coleman | 301/37.108 |
| 1,329,935 A | * | 2/1920 | Smith | 301/37.41 |
| 1,481,363 A | * | 1/1924 | Hall | 301/37.109 |
| 1,745,163 A | * | 1/1930 | Graham | 301/37.108 |
| 1,950,082 A | * | 3/1934 | Farr | 301/37.41 |
| 1,987,223 A | * | 1/1935 | Zerk | 301/37.41 |
| 1,989,839 A | * | 2/1935 | Zeller | 301/37.41 |
| 2,392,634 A | * | 1/1946 | Bierman | 359/524 |
| 3,854,777 A | * | 12/1974 | Kennedy | 301/37.41 |
| 4,488,774 A | * | 12/1984 | Kagayama | 362/473 |
| 4,910,053 A | * | 3/1990 | McDonald et al. | 301/37.108 X |
| 5,078,453 A | * | 1/1992 | Siwek | 301/37.101 |
| 5,239,396 A | * | 8/1993 | Thompson | 359/523 X |
| 5,441,334 A | * | 8/1995 | Botterman et al. | 301/37.101 |
| 5,652,677 A | * | 7/1997 | Burison | 301/37.41 X |
| 6,220,733 B1 | * | 4/2001 | Gordon | 362/500 |

* cited by examiner

*Primary Examiner*—Russell D. Stormer
(74) *Attorney, Agent, or Firm*—Michael I. Kroll

(57) ABSTRACT

An improved wheel is provided wherein decorative items such as gem stones are embedded in either the wheel surface, a special mounting section attached to the wheel surface, or to a spoke strap that wraps around each spoke and positions embedded gem stones on the outside surface of the spoke. The improvement and related devices are symmetrically attached for positional correspondence of the decorative items among the spokes. Spokes or spoke-like features of wheel covers are similarly improved.

19 Claims, 12 Drawing Sheets

DECORATIVE JEWELED WHEEL COVER

BACKGROUND OF THE INVENTION

1. Field of the Invention

The present invention relates generally to wheels and wheel covers and, more specifically, to a means for enhancing the appearance and value of a motor vehicle by improving the appearance of the wheels and/or wheel covers. The appearance of wheels and wheel covers can be enhanced by embedding decorative items, such as gem stones, into the wheel covers of said vehicle by providing recesses within the wheel or wheel cover, and adhesively attaching means of creating settings for the decorative items by creating recesses within the wheel or wheel cover and adhesively attaching the decorative items within the recesses.

Alternately, the appearance can be enhanced by setting the decorative items either frictionally or adhesively within a mounting having holding means such as recesses or adhesives for the inserted decorative items, the mounting having a decor section with a surface for applying an adhesive, such that the mounting can be selectively positioned upon said wheel cover, thereby creating a personalized appearance to said wheel cover.

An additional element is provided in the form of a strap having a generally planar element with decorative items imbedded therein. The planar element has elastic straps extending from opposite sides of the planar element. At the distal ends of the elastic straps are mating members of hook and loop material whereby the strap can be wrapped around one of the wheel spokes and fastened thereto by selectively engaging the mating hook and loop elements of the strap.

2. Description of the Prior Art

There are other ornamental wheel covers designed to enhance the appearance of a vehicle. Typical of these is U.S. Pat. No. Des. 267,402 issued to Schinella on Dec. 28, 1982.

Another patent was issued to Dockins on Jan. 18, 1994 as U.S. Pat. No. Des. 343,379. Yet another U.S. Pat. No. Des. 370,000 was issued to Lombard on May 21, 1996.

U.S. Pat. No. Des. 267,402

Inventor: John R. Schinella

Issued: Dec. 28, 1982

This United States Patent discloses an ornamental design for a vehicle wheel as illustrated in the drawings of the patent.

U.S. Pat. No. Des. 343,379

Inventor: Alwin Dockins

Issued: Jan. 18, 1994

This United States Patent discloses an ornamental design for a vehicle wheel as illustrated in the drawings of the patent.

U.S. Pat. No. Des. 370,000

Inventor: Charles Lombard

Issued: May 21, 1996

This United States Patent discloses an ornamental design for a vehicle wheel as illustrated in the drawings of the patent.

While these decorative wheel covers may be suitable for the purposes for which they were designed, they would not be as suitable for the purposes of the present invention, as hereinafter described.

SUMMARY OF THE PRESENT INVENTION

A primary object of the present invention is to provide a permanent means for enhancing the value and appearance of a motor vehicle.

Another object of the present invention is to provide a permanent novel means of individualizing the appearance of a motor vehicle.

Yet another object of the present invention is to provide a permanent novel means of individualizing the appearance of a motor vehicle by attaching decorative items such as gem stones in personalized designs to the wheel covers.

Still yet another object of the present invention is to provide a kit that will incorporate the materials and instructions on how to personalize the wheel covers of an automobile, truck, motorcycle, bicycle, aircraft or any other vehicle having wheels and wheel covers with spokes.

Another object of the present invention is to provide a semi-permanent means for personalizing the wheels or wheel covers of a motor vehicle that will allow an individual to remove, modify or selectively change the design, such as for sporting events and holidays.

Yet another object of the present invention is to provide a semi-permanent means for personalizing the wheel covers of a motor vehicle without affecting the structure or integrity of the wheels or wheel covers.

Still yet another object of the present invention is to provide an additional element in the form of a strap that can be selectively attached/removed at the discretion of the user.

Another object of the present invention is to provide a spoke strap having a planar element for embedding gems therein.

Yet another object of the present invention is to provide a spoke strap having a planar element with elastic straps attached to opposite sides of said planar element.

Still yet another object of the present invention is to provide a spoke strap having mating members of hook and loop material fixedly positioned on each distal end of the elastic straps.

Another object of the present invention is to provide a jewel-like strap that can be selectively wrapped around a wheel or wheel cover spoke and held thereon by engaging the hook and loop material.

Additional objects of the present invention will appear as the description proceeds.

The present invention overcomes the shortcomings of the prior art by providing a permanent means for personalizing and enhancing the appearance and value of a motor vehicle by embedding decorative items such as gemstones into the wheel covers of a motor vehicle. Additionally, such shortcomings are overcome by providing an alternate embodiment for personalizing the wheels or wheel covers of a motor vehicle in the form of a kit of the materials needed and instructions on how to apply said materials.

Additionally there is provided an additional element in the form of a spoke strap having gems embedded therein having elastic straps with mating member of hook and loop material affixed thereto.

An improved wheel of the type having at least three spaced-apart spoke sections is provided, the improvement comprising: the spoke section, each spoke section comprising a plurality of cavities, each of the cavities on each of the spoke sections having a one-to-one positional correspondence with one of the cavities on each of the other spoke members; and a plurality of decorative items, each decorative item being closely received by and secured within one of the cavities.

In one embodiment of the foregoing improvement, the decorative items are jewels.

In another embodiment of the above improvement, the decorative items are jewel-shaped.

In another embodiment of the above improvement, the decorative items are emblems.

In another embodiment of the above improvement, the decorative items are geometric figures.

In another embodiment of the above improvement, the decorative items are beads.

In another embodiment of the above improvement, the decorative items are balls.

An improved wheel of the type having at least three spaced-apart spoke sections is provided, the improvement comprising: at least three decorative item sets, each set having a like number of decorative items; and at least three mounting sections, each mounting section closely receiving the decorative items of one decorative item set, the mounting sections being adapted for attachment to one of the spoke sections such that the mounting sections are symmetrically arranged on the wheel and the decorative item sets are arranged on the mounting sections in substantially similar patterns.

In one embodiment of the foregoing improvement, the at least one mounting section is included for each spoke section.

In another embodiment of the above improvement, each mounting section is attached to the spoke section adhesively.

In another embodiment of the above improvement, each mounting section is attached to the spoke section by fasteners.

In another embodiment of the above improvement, each mounting section is curved such that the mounting section is substantially flush with the spoke section.

In another embodiment of the above improvement, the decorative items are jewels.

In another embodiment of the above improvement, the decorative items are jewel-shaped.

In another embodiment of the above improvement, the decorative items are emblems.

In another embodiment of the above improvement, the decorative items are geometric figures.

In another embodiment of the above improvement, the decorative items are beads.

In another embodiment of the above improvement the decorative items are balls.

A device is provided for attachment to wheels of the type having at least three spoke sections, the device comprising: at least one decorative item; and a spoke wrap, the spoke wrap comprising: a decor section, the decor section having at least one mounting position for securing each of the at least one decorative items; and a first wrap section and a second wrap section, the first wrap section having an end and the second wrap section having an end, the first and second wrap section ends being joinable such that when the decor section is positioned adjacent one of the spoke sections, the first wrap section and the second wrap section are extendable behind the spoke section for joinder of the first wrap section end to the second wrap section end, and further such that the joinder secures the spoke wrap to the spoke section.

In one embodiment of the foregoing device, the first wrap section end and the second wrap section end are detachably joinable In another embodiment of the above device, at least one decor section is included for each spoke section.

In another embodiment of the above device, the decor sections secure the decorative items in substantially similar patterns.

In another embodiment of the above device, a plurality of decorative items is mounted on each decor section.

In another embodiment of the above device, the device further comprises a hook and loop fastener for joining the first wrap section end to the second wrap section end.

In another embodiment of the above device, the device further comprises a snap fastener for joining the first wrap section end to the second wrap section end.

In another embodiment of the above device, the device further comprises a button fastener for joining the first wrap section end to the second wrap section end.

In another embodiment of the above device, the device further comprises a zipper fastener for joining the first wrap section end to the second wrap section end.

In another embodiment of the above device, the device further comprises a hook and a hook receptacle for securing for joining the first wrap section end to the second wrap section end by inserting the hook into the hook receptacle.

In another embodiment of the above device, the decorative items are jewels.

In another embodiment of the above device, the decorative items are jewel-shaped.

In another embodiment of the above device, the decorative items are emblems.

In another embodiment of the above device, the decorative items are geometric figures.

In another embodiment of the above device, the decorative items are beads.

In another embodiment of the above device, the decorative items are balls.

In another embodiment of the above device, the decor section is generally flat, and the decorative items are adhesively attached.

In another embodiment of the above device, the decor section further comprises one or more recesses for closely receiving and securing the decorative items.

An improved wheel cover of the type having at least three spaced-apart spoke sections is provided, the improvement comprising: the spoke section, each spoke section comprising a plurality of cavities, each of the cavities on each of the spoke sections having a one-to-one positional correspondence with one of the cavities on each of the other spoke members; and a plurality of decorative items, each decorative item being closely received by and secured within one of the cavities.

An improved wheel cover of the type having at least three spaced-apart spoke sections is provided, the improvement comprising: at least three decorative item sets, each set having a like number of decorative items; and at least three mounting sections, each mounting section closely receiving the decorative items of one decorative item set, the mounting sections being adapted for attachment to one of the spoke sections such that the mounting sections are symmetrically arranged on the wheel cover and the decorative item sets are arranged on the mounting sections in substantially similar patterns.

A device is provided for attachment to wheel covers of the type having at least three spoke sections, the device comprising: at least one decorative item; a spoke wrap, the spoke wrap comprising: a decor section, the decor section having at least one mounting position for closely receiving and securing each of the at least one decorative items; and a first wrap section and a second wrap section, the first wrap section having an end and the second wrap section having an end, the first and second wrap section ends being joinable such that when the decor section is positioned adjacent one of the spoke sections, the first wrap section and the second wrap section are extendable behind the spoke section for joinder of the first wrap section end to the second wrap section end, and further such that the joinder secures the spoke wrap to the spoke section.

An improved wheel of the type having at least three spaced-apart spoke sections is provided, the improvement comprising: a plurality of decorative items; and means for embedding the decorative items on the spokes such that each of the decorative items have a one-to-one positional correspondence with one of the decorative items on each of the other spoke members.

An improved wheel of the type having at least three spaced-apart spoke sections is provided, the improvement comprising: a plurality of decorative items; and means for embedding the decorative items on the spokes such that each of the decorative items have a one-to-one positional correspondence with one of the decorative items on each of the other spoke members.

An improved wheel of the type having at least three spaced-apart spoke sections is provided, the improvement comprising: at least three decorative item sets, each set having a like number of decorative items; and means for positioning the decorative pluralities in positional correspondence on the spokes.

In one embodiment of the foregoing improvement, the improvement further comprises means for alternately removing and attaching the means for positioning the decorative items on the spokes.

An improved wheel cover of the type having at least three spaced-apart spoke sections is provided, the improvement comprising: at least three decorative item sets, each set having a like number of decorative items; and means for positioning the decorative pluralities in positional correspondence on the spokes.

A kit for improving a wheel of the type having at least three spoke sections is provided, the kit comprising: at least three decorative item sets, each set having a like number of decorative items; at least three mounting sections, each mounting section having recesses for closely receiving and securing the decorative items of one decorative item set, the mounting sections having an adhesive strip for attachment to one of the spoke sections such that the mounting sections are symmetrically arranged on the wheel and the decorative item sets are arranged on the mounting sections in substantially similar patterns; and an adhesive for securing the decorative items in the mounting section recesses.

The foregoing and other objects and advantages will appear from the description to follow. In the description reference is made to the accompanying drawings, which form a part hereof, and in which are shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 4:
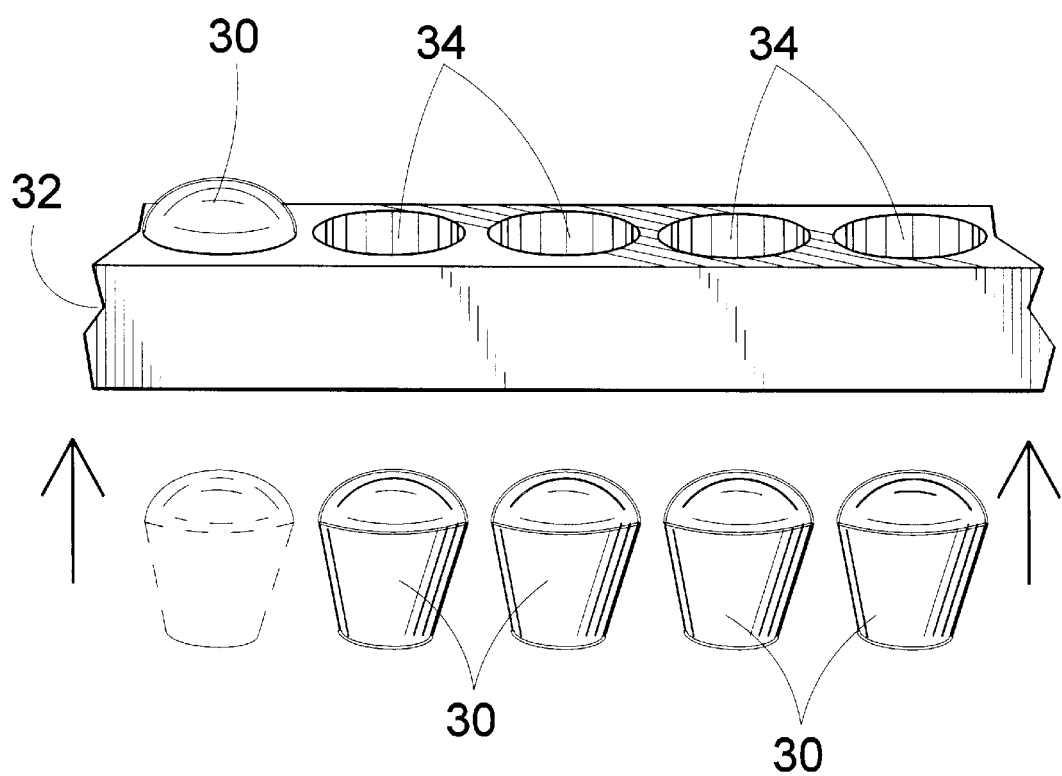

FIG. 4 perspective view of several of the gems removed from the mounting section.

Figure 5:
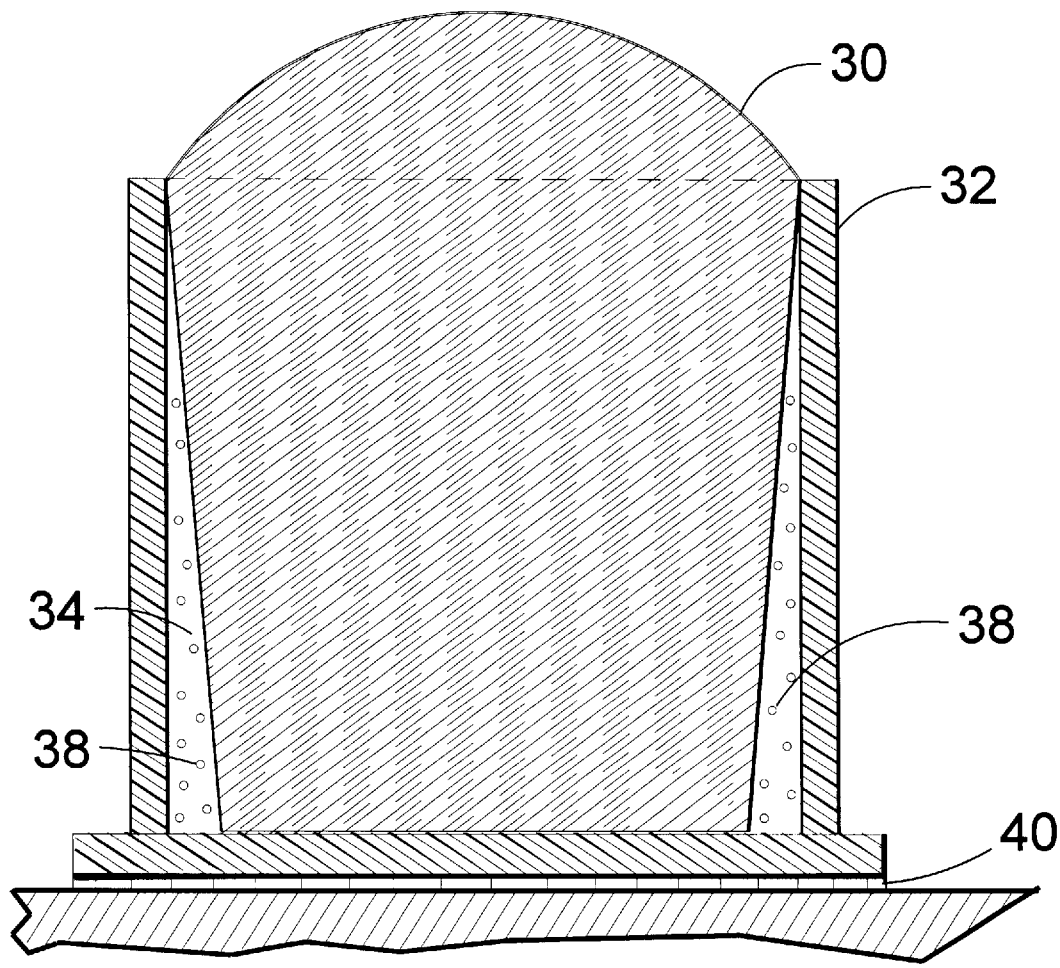

FIG. 5 is a cross-sectional view of the mounting section having a gem frictionally and adhesively held therein.

Figure 6:
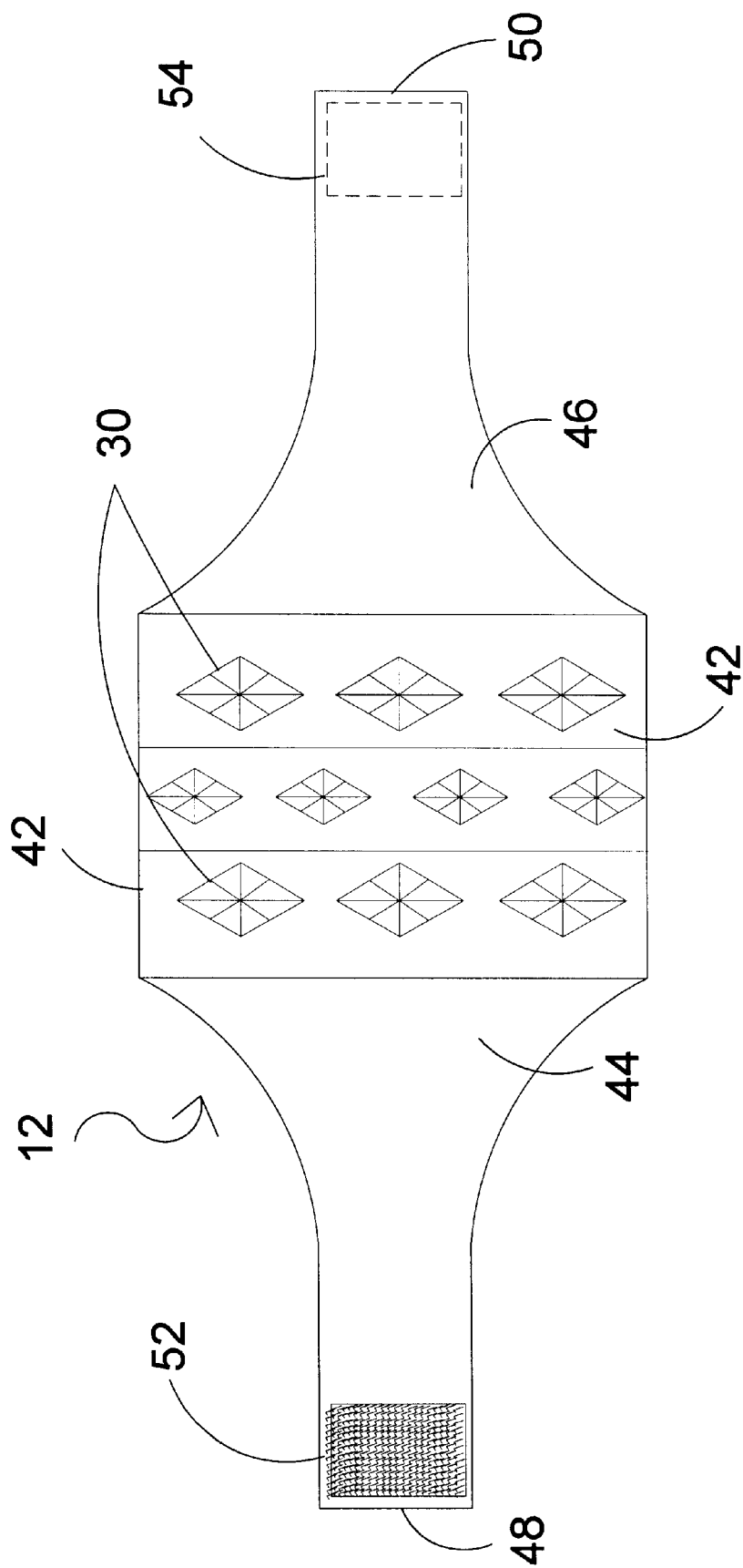

FIG. 6 is a front view of the spoke strap having a planar element with embedded gems and elastic straps with mating members of hook and loop material attached at each distal end.

Figure 7:
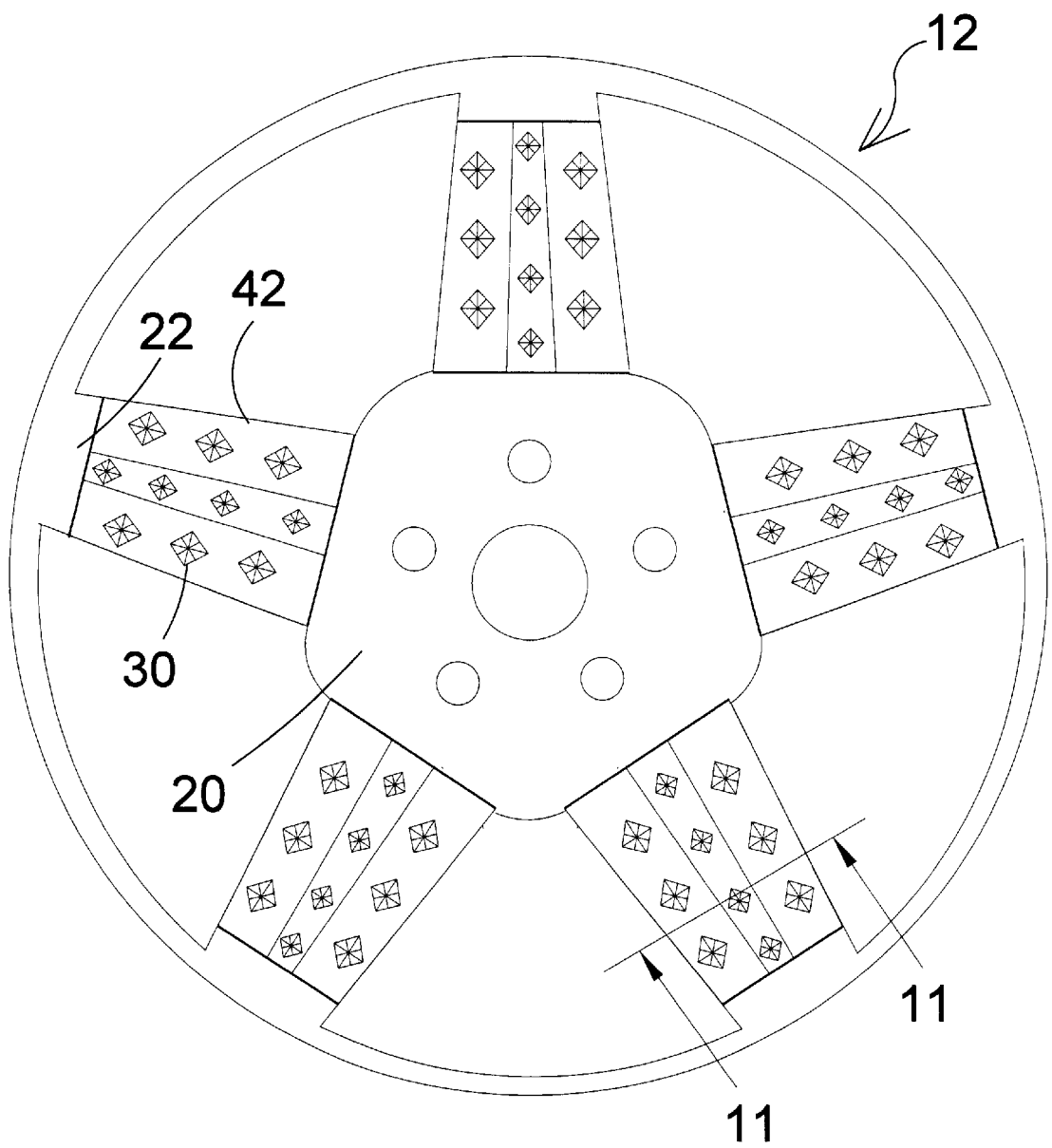

FIG. 7 is an illustrative view of a wheel having a plurality of spoke straps attached to he spokes of the wheel.

Figure 8:
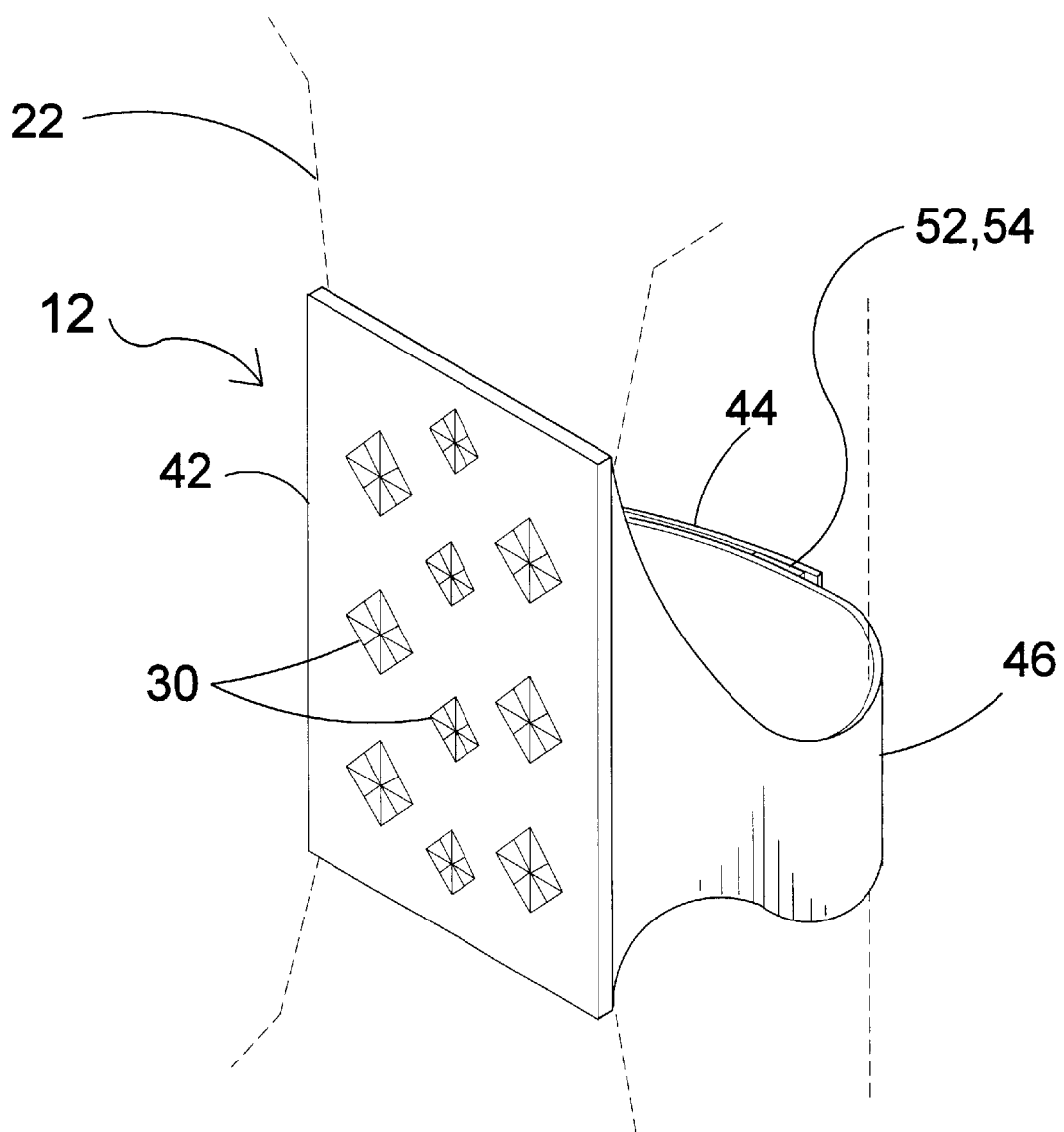

FIG. 8 is a view of a wheel spoke, shown in phantom, having a spoke strap wrapped thereon.

Figure 9:
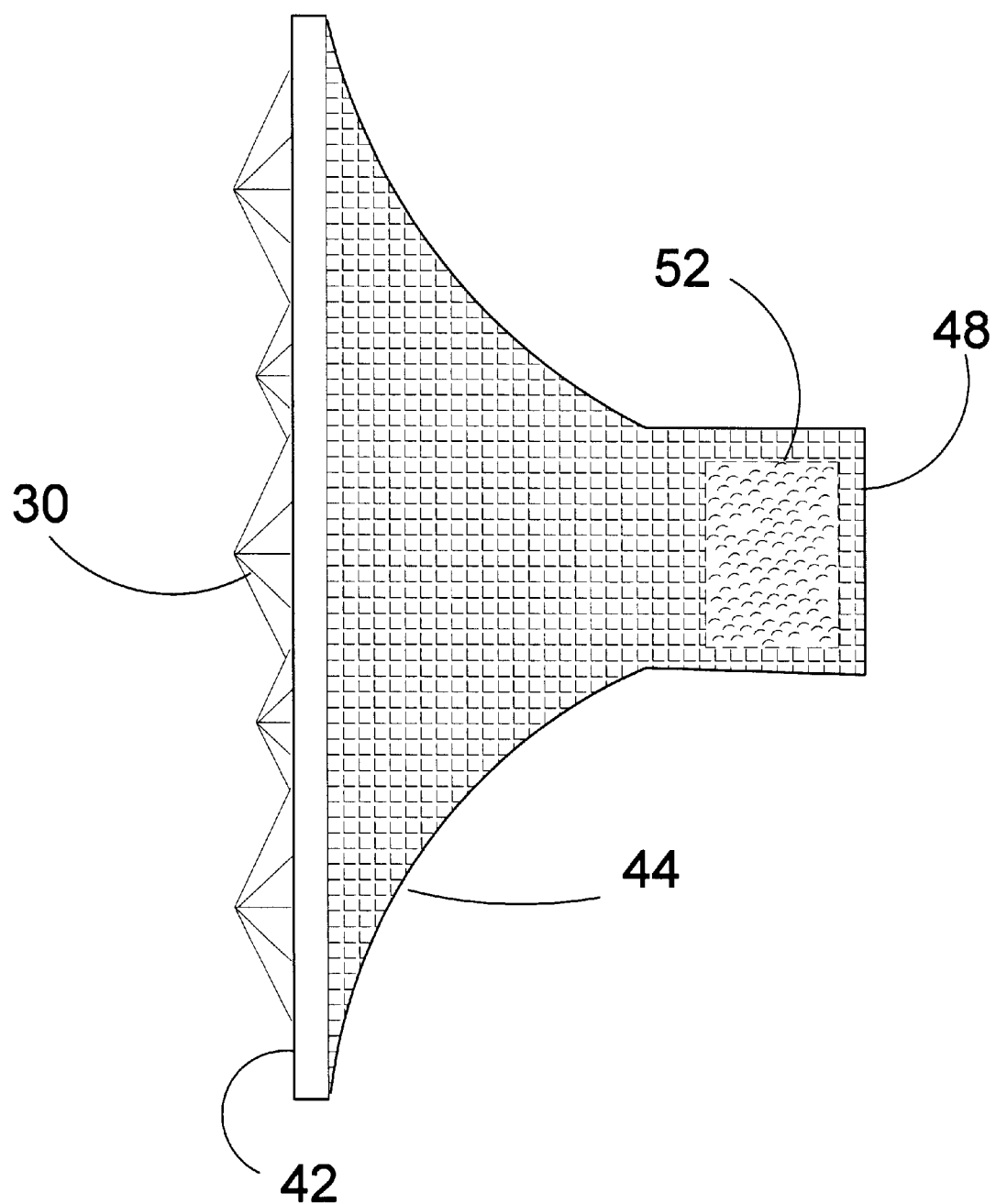

FIG. 9 is a side view of the spoke strap having a planar fascia element with gems embedded therein. Also shown is one of the elastic straps with one of the mating hook and loop material members fixedly positioned at one distal end.

Figure 10:
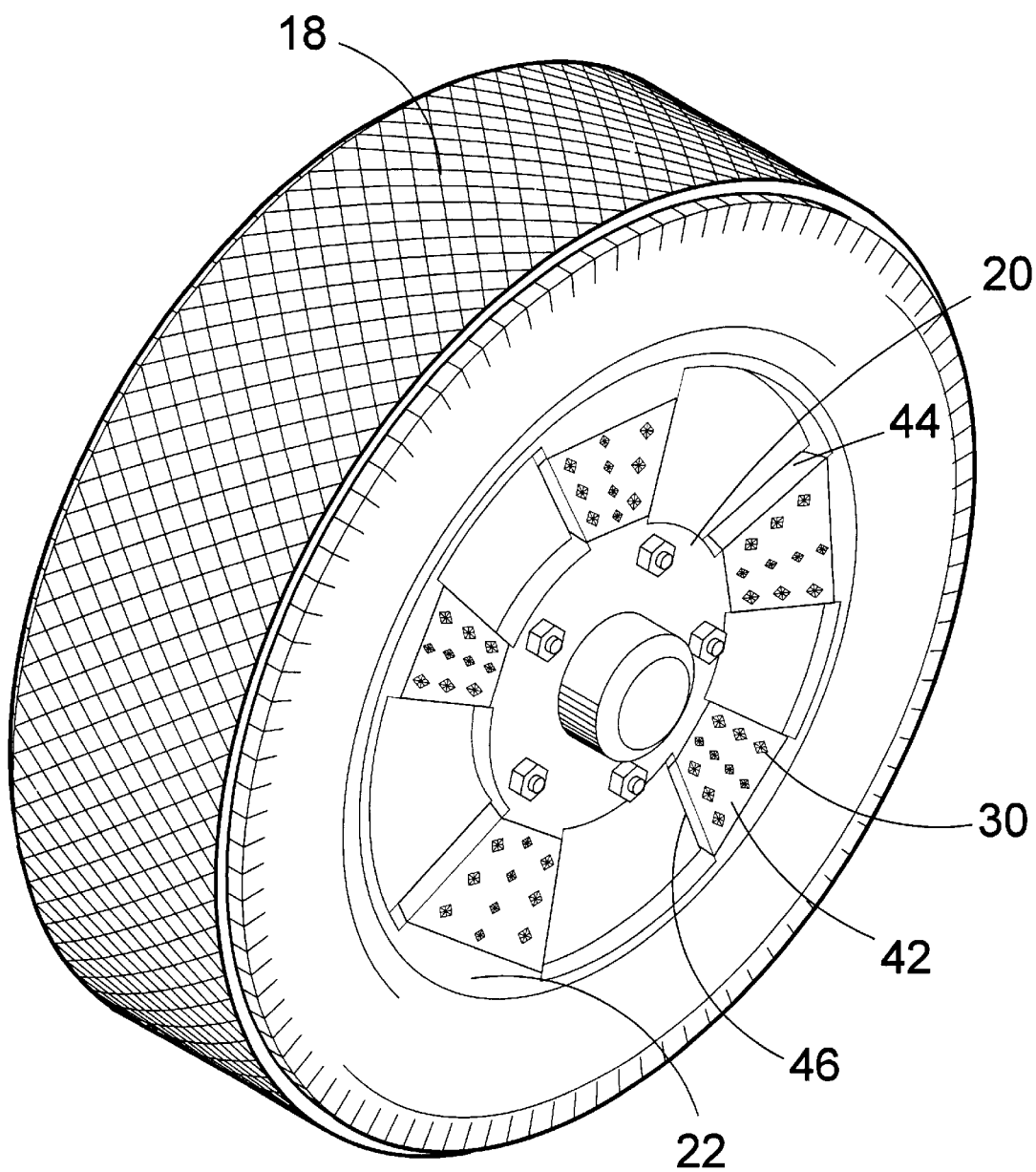

FIG. 10 is a perspective view of a wheel having a plurality of spoke straps attached to the spokes of a wheel cover.

Figure 11:
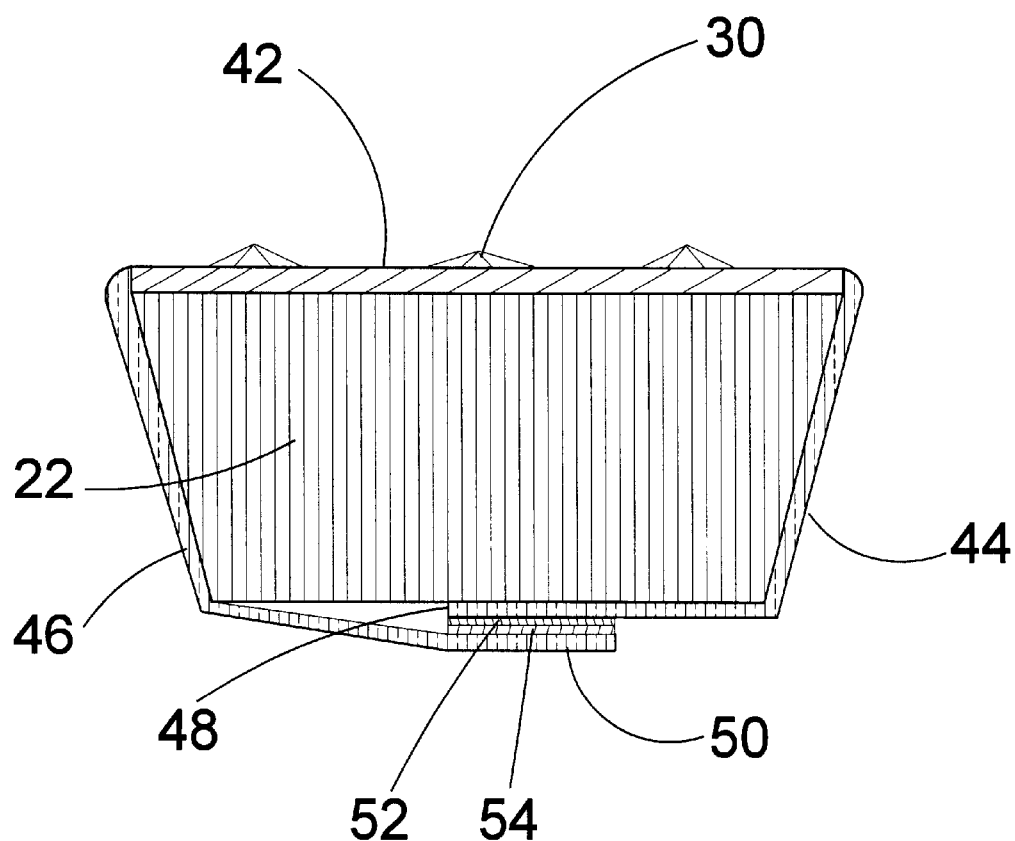

FIG. 11 is a cross sectional view, taken from FIG. 7 as indicated, showing the spoke strap wrapped around a wheel spoke.

Figure 12:
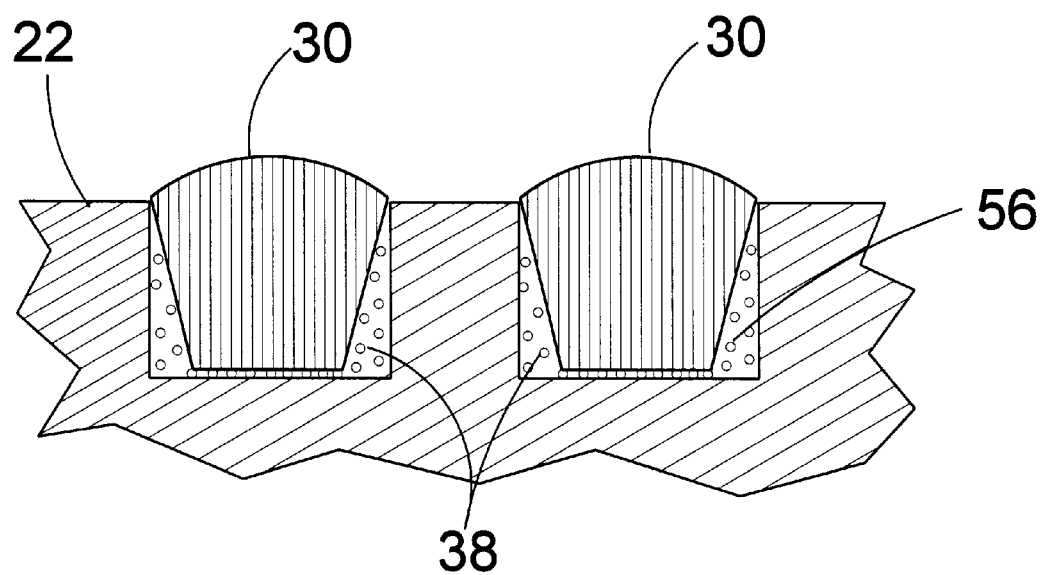

FIG. 12 is a cross-sectional view of a wheel surface with gems held within the recesses.

DESCRIPTION OF THE REFERENCED NUMERALS

Turning now descriptively to the drawings, in which similar reference characters denote similar elements throughout the several views, the figures illustrate the embodiments of the decorative jeweled wheel cover of the present invention. With regard to the reference numerals used, the following numbering is used thoughout the various drawing figures.

10 first embodiment of the present invention
12 second embodiment of the present invention
14 third embodiment of the present invention
16 motor vehicle
18 tire
20 wheel
22 spokes 30 decorative items
32 first embodiment mounting section
34 mounting section recesses
38 mounting section decorative item adhesive
40 mounting section spoke adhesive
42 second embodiment center section
44 second embodiment first wrap section
46 second embodiment second wrap section
48 second embodiment first wrap section end
50 second embodiment second wrap section end
52 second embodiment first hook and loop portion
54 second embodiment second hook and loop portion
56 third embodiment wheel recesses

DETAILED DESCRIPTION OF THE PREFERRED EMBODIMENTS

Turning now descriptively to the drawings, in which similar reference characters denote similar elements throughout the several views, FIGS. 11–11 illustrate the decorative jeweled wheels and wheel covers of the present invention indicated generally by the numerals 10, 12 and 14 for three embodiments.

The device 10,12,14 is depicted to various extents in FIGS. 1–11. A first embodiment 10 is shown in use in FIG. 1, in association with a motor vehicle 16 and a tire 18, and is shown generally in FIGS. 2–5. A second embodiment 12 is depicted in FIGS. 6–11, and a third embodiment 14 in FIG. 12. All embodiments 10,12,14 are shown in the drawings on a wheel 20, having spokes 22. Wheels 20 of this type are often referred to as "mags." It is often the case, however, that wheel covers have similar spokes, or spoke-like features, and my invention includes those types of wheel covers, and devices for attachment to such wheel covers.

All embodiments 10,12,14 include decorative items 30 that are chosen for their aesthetic value and their combinational readiness, such that many colorful patterns can be formed in the application of my invention. The decorative items 30, can be jewels, jewel-shaped objects, emblems, geometric figures, beads, balls, and similar objects, all in accordance with the present invention, and as determined by the intended end use for the overall device 10,12,14, as will occur to those of skill in the art upon review of the present disclosure.

Figure 1:
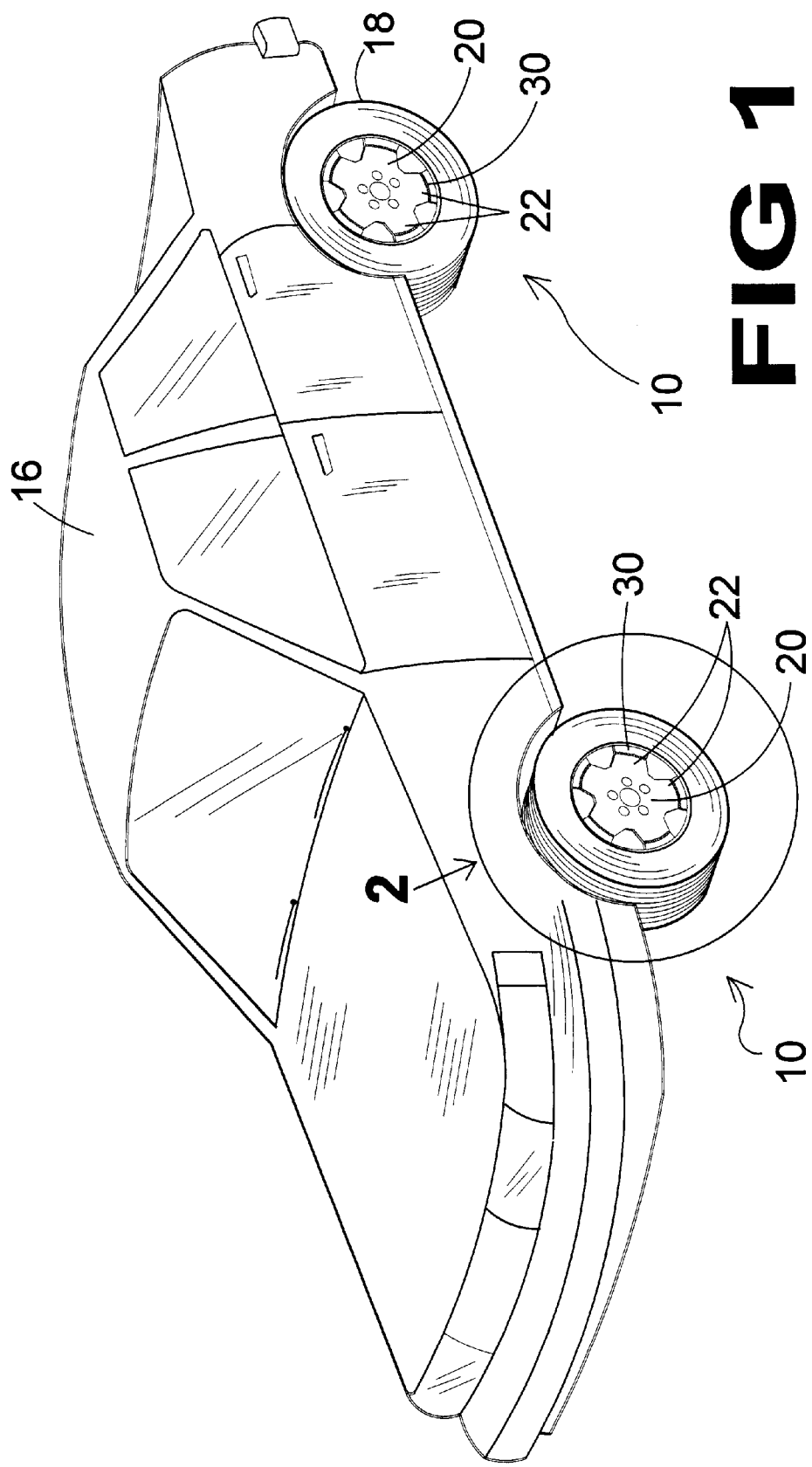
FIG. 1 is a perspective view of the present invention installed on a motor vehicle.
Figure 2:
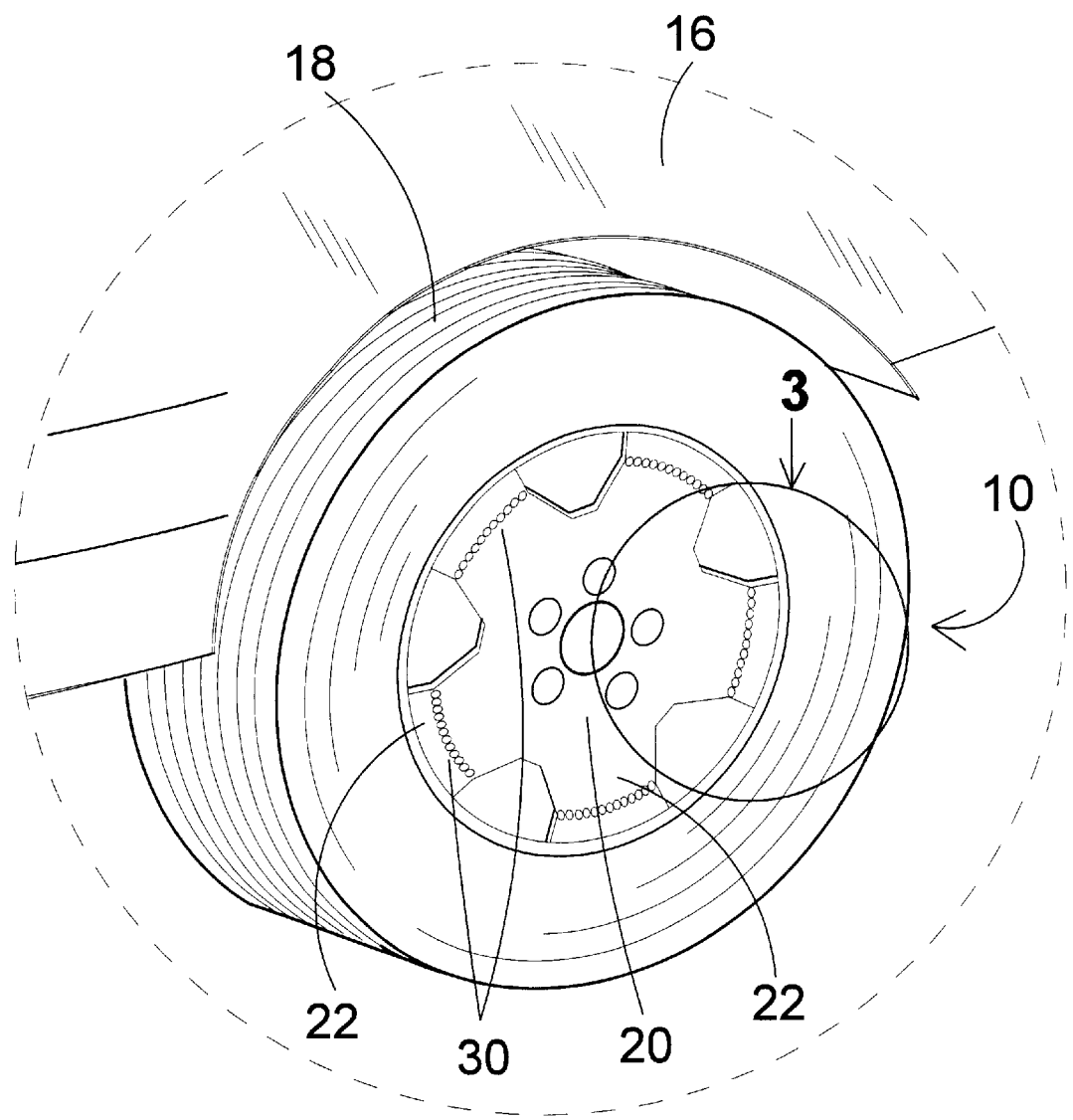
FIG. 2 is an enlarged view of a wheel, taken from FIG. 1 as indicated, having the present invention installed thereon.
Figure 3:
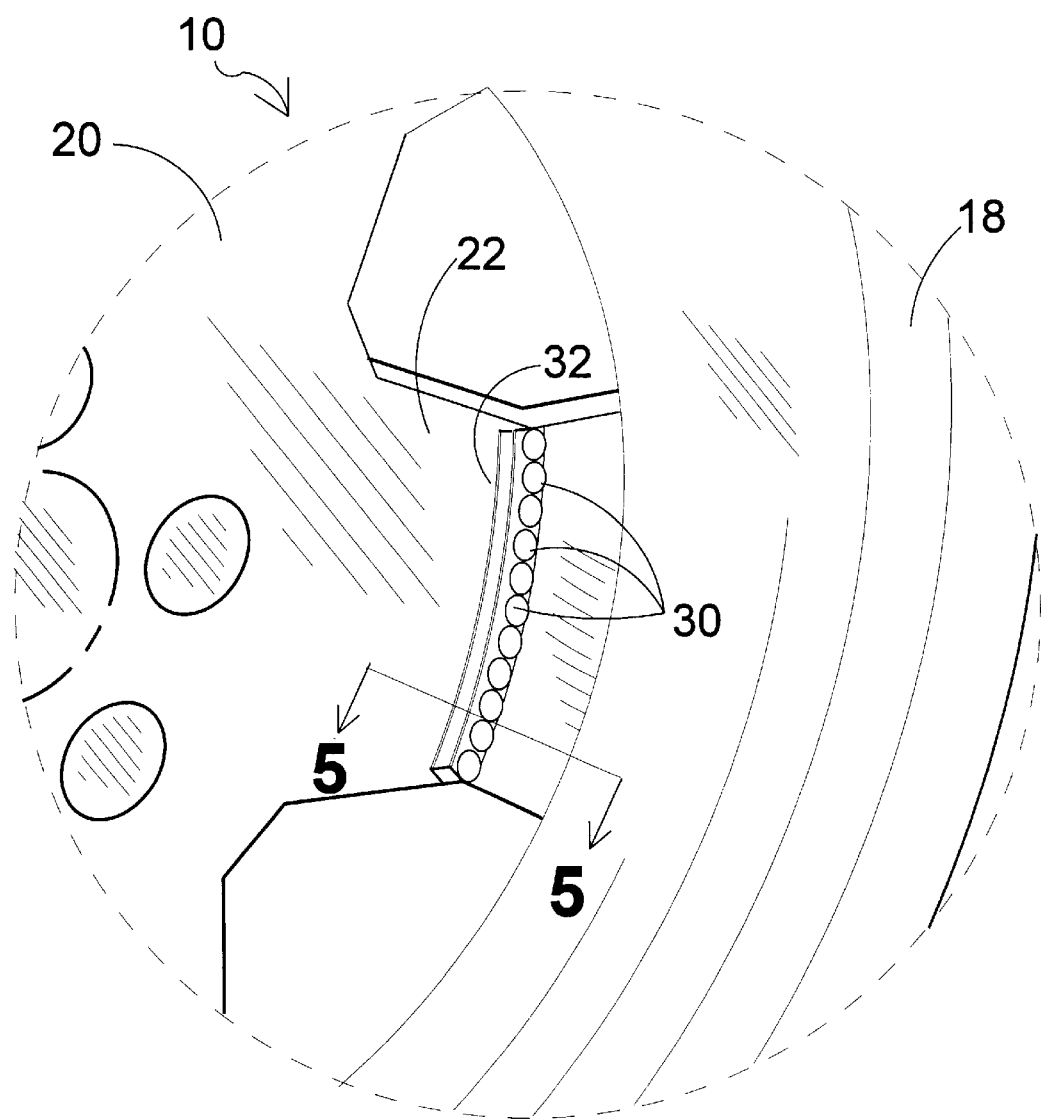
FIG. 3 is an enlarged view, taken from FIG. 2 as indicated, of a wheel having embedded gems within a mounting section attached to the wheel.

In a first embodiment 10, matching mounting sections 32 are provided, as shown generally in FIGS. 1–5 and in use in FIGS. 1 and 2. The mounting sections 32 can be of many different shapes, in addition to the elongated and slightly arcuate embodiment of the mounting sections 32 shown in FIG. 3.

As shown in FIG. 4 and FIG. 5, each mounting section 32 includes recesses 34 for receiving and securing decorative items 30, either by friction or by an adhesive 38 or both. Each mounting section 32 arranges the decorative items 30 in a pattern that corresponds with the decorative item 30 pattern in the other mounting sections 32, creating an enhanced appearance of the wheel 20, as shown in FIG. 2.

The mounting sections 32 are attached to the spokes 22 by an adhesive 40 in this embodiment 10, although other fasteners, such as screws, bolts, and the like, could be used, all in accordance with the present invention, and as determined by the intended end use for the overall device 10, as will occur to those of skill in the art upon review of the present disclosure.

The components of this embodiment 10 can be provided to the ultimate user, in unassembled form, for self-installation, according to the provided instructions.

As shown generally in FIGS. 6–11, and in use in FIG. 10, a second embodiment 12 is provided that can also be installed by the owner of the motor vehicle 16. This embodiment 12, includes a center portion 42 to which a number of decorative items 30 are secured by adhesives, although recesses in the center portion 42 can also be provided such that the decorative items 30 can be secured in a similar manner to the installation of decorative items 30 in the mounting sections 32 of the first embodiment 10.

The decorative items 30 are positioned in a substantially similar pattern on each center section 42 such that a corresponding decorative item 30 pattern is symmetrically presented on each spoke 22, as shown in FIG. 5 and FIG. 10 for a wheel 20 having five spokes 22. The center section 42 can be resilient or stiff.

Extending from either side of the center section 42 is a first wrap section 44 and a second wrap section 46, each having an end 48,50 to which a hook and loop fastener portion 52,54 is attached for joinder of the ends 48,50. This embodiment 12 is provided in plurality such that each spoke 22 presents the decorative item 30 pattern on a center section 42, after the first wrap section 44 and the second wrap section 46 are wrapped around the spoke 22 and joined by pressing the hook and loop fastener portions 52,54 together. In order to fit spokes 22 having varying circumferences, the center section 42 and first and second wrap sections 44,46 are resilient for stretching as needed to fit the spoke 22.

Although a hook and loop fastener 52,54 is depicted, other fasteners, such as snaps, buttons, zippers, and a traditional hook and hole, can also be utilized, all in accordance with the present invention, and as determined by the intended end use for the overall device 12, as will occur to those of skill in the art upon review of the present disclosure.

To install the device in this embodiment 12, the user positions the center section 42 in the desired location on the spoke 22, and then wraps the first and second wrap sections 44,46 around the spoke 22. While stretching the first and second wrap sections 44,46 to the desired tension, the first and second wrap section ends 48,50 are then fastened by pressing the first and second hook and loop portions 52,54. This is repeated for each spoke 22. When finished each decorative item 30 has a corresponding decorative item 30 in a corresponding position on each of the other spokes 22.

When appropriately positioned on the spokes 22, the center sections 42 position the decorative item 30 patterns in a symmetrical manner on the wheel 20, thus enhancing the appearance of both the wheel 20 and the motor vehicle 16.

In a third embodiment 14 the wheel 20 is improved by providing recesses 56 within each spoke 22 and placing a decorative item 30 in each recess 56. As shown in FIG. 12, the recesses 56 are sized such that each decorative item is closely received by the recess 56 in which it is placed, and is secured by the recess 56 using a friction fit or adhesives 38. The decorative items 30 are configured in attractive arrangements on each spoke 22, with each spoke 22 having a pattern of decorative items 30 that corresponds to the patterns on the other spokes 22. Such correspondence among the decorative item 30 patterns establishes an aesthetically pleasing, symmetrical enhancement to the overall wheel 20 appearance.

It will be understood that each of the elements described above, or two or more together may also find a useful application in other applications differing from that described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for attachment to wheels of the type having at least three spoke sections, the device comprising:
    at least one decorative item; and
    a spoke wrap, the spoke wrap comprising:
        a decor section, the decor section having at least one mounting position for securing each of the at least one decorative items; and
        a first wrap section and a second wrap section, the first wrap section having an end and the second wrap section having an end, the first and second wrap section ends being joinable such that when the decor section is positioned adjacent one of the spoke sections, the first wrap section and the second wrap section are extendable behind the spoke section for joinder of the first wrap section end to the second wrap section end, and further such that the joinder secures the spoke wrap to the spoke section.

2. The device of claim 1, wherein the first wrap section end and the second wrap section end are detachably joinable.

3. The device of claim 1, wherein at least one decor section is included for each spoke section.

4. The device of claim 1, wherein the decor sections secure the decorative items in substantially similar patterns.

5. The device of claim 1, wherein a plurality of decorative items are mounted on each decor section.

6. The device of claim 1, further comprising a hook and loop fastener for joining the first wrap section end to the second wrap section end.

7. The device of claim 1, further comprising a snap fastener for joining the first wrap section end to the second wrap section end.

8. The device of claim 1, further comprising a button fastener for joining the first wrap section end to the second wrap section end.

9. The device of claim 1, further comprising a zipper fastener for joining the first wrap section end to the second wrap section end.

10. The device of claim 1, further comprising a hook and a hook receptacle for securing for joining the first wrap section end to the second wrap section end by inserting the hook into the hook receptacle.

11. The device of claim 1, wherein the decorative items are jewels.

12. The device of claim 1, wherein the decorative items are jewel-shaped.

13. The device of claim 1, wherein the decorative items are emblems.

14. The device of claim 1, wherein the decorative items are geometric figures.

15. The device of claim 1, wherein the decorative items are beads.

16. The device of claim 1, wherein the decorative items are balls.

17. The device of claim 1, wherein the decor section is generally flat, and the decorative items are adhesively attached.

18. The device of claim 1, wherein the decor section further comprises one or more recesses for closely receiving and securing the decorative items.

19. A device for attachment to wheel covers of the type having at least three spoke sections, the device comprising:
    at least one decorative item;
    a spoke wrap, the spoke wrap comprising:
        a decor section, the decor section having at least one mounting position for closely receiving and securing each of the at least one decorative items; and
        a first wrap section and a second wrap section, the first wrap section having an end and the second wrap section having an end, the first and second wrap section ends being joinable such that when the decor section is positioned adjacent one of the spoke sections, the first wrap section and the second wrap section are extendable behind the spoke section for joinder of the first wrap section end to the second wrap section end, and further such that the joinder secures the spoke wrap to the spoke section.

* * * * *